US012432162B2

(12) United States Patent
Wang et al.

(10) Patent No.: US 12,432,162 B2
(45) Date of Patent: Sep. 30, 2025

(54) DYNAMIC BANDWIDTH CAPACITY CONTROL FOR ENTERPRISES

(71) Applicant: HEWLETT PACKARD ENTERPRISE DEVELOPMENT LP, Spring, TX (US)

(72) Inventors: Bo Wang, Shanghai (CN); Joao Luiz Soares Martins, Rio de Janeiro (BR)

(73) Assignee: Hewlett Packard Enterprise Development LP, Spring, TX (US)

( * ) Notice: Subject to any disclaimer, the term of this patent is extended or adjusted under 35 U.S.C. 154(b) by 94 days.

(21) Appl. No.: 18/446,150

(22) Filed: Aug. 8, 2023

(65) Prior Publication Data

US 2025/0055809 A1  Feb. 13, 2025

(51) Int. Cl.
*H04L 12/24* (2006.01)
*H04L 41/0803* (2022.01)
*H04L 47/70* (2022.01)
*H04L 47/762* (2022.01)

(52) U.S. Cl.
CPC .......... *H04L 47/827* (2013.01); *H04L 47/762* (2013.01); *H04L 47/828* (2013.01)

(58) Field of Classification Search
CPC .... H04L 47/827; H04L 47/762; H04L 47/828
USPC ....................................................... 709/226
See application file for complete search history.

(56) References Cited

U.S. PATENT DOCUMENTS

| | | | |
|---|---|---|---|
| 4,566,063 A | 1/1986 | Zolnowsky et al. | |
| 6,564,336 B1 | 5/2003 | Majkowski | |
| 7,117,483 B2 | 10/2006 | Dorr et al. | |
| 7,711,716 B2 | 5/2010 | Stonecipher | |
| 8,676,769 B2 | 3/2014 | Costaglio | |
| 10,360,192 B1 | 7/2019 | Sela et al. | |
| 2005/0278397 A1 | 12/2005 | Clark | |

(Continued)

OTHER PUBLICATIONS

3GPP TS 23.501, "3rd Generation Partnership Project; Technical Specification Group Services and System Aspects; System architecture for the 5G System (5GS); Stage 2 (Release 15)", V15.11.0, 2020, 250 pages.

(Continued)

*Primary Examiner* — Ario Etienne
*Assistant Examiner* — Elizabeth Kassa
(74) *Attorney, Agent, or Firm* — Sheppard Mullin Richter & Hampton LLP

(57) ABSTRACT

Systems and methods provide an affordable private bandwidth reservation and control solution for enterprises that can be implemented using both 5G and 4G core equipment. Namely, an enterprise can purchase/contract for a predetermined amount of bandwidth (e.g., 1 Gbps) that a Communication Service Provider (CSP) will reserve for connected client devices of the enterprise that meet a set of criteria defined by the enterprise/CSP: i.e., dynamic bandwidth capacity control (DBCC) group criteria. Client devices that meet this DBCC group criteria may be "bound" to a DBCC group session. If a bound client device no longer meets the DBCC group criteria, the client device may be unbound from the DBCC group session. As client devices bind and unbind from a DBCC group session, examples can dynamically modify an aggregation bandwidth capacity control policy that defines bandwidth allocation for client devices bound to the DBCC group session.

13 Claims, 6 Drawing Sheets

(56) References Cited

U.S. PATENT DOCUMENTS

| | | | |
|---|---|---|---|
| 2010/0120359 A1* | 5/2010 | Agarwal | H04B 7/18539 |
| | | | 455/12.1 |
| 2011/0149875 A1* | 6/2011 | Ahuja | H04L 47/828 |
| | | | 370/329 |
| 2012/0185586 A1* | 7/2012 | Olshansky | G06F 3/04847 |
| | | | 709/224 |
| 2015/0236915 A1* | 8/2015 | Mohammed | H04L 67/30 |
| | | | 709/223 |
| 2015/0382386 A1* | 12/2015 | Castro Castro | H04W 76/11 |
| | | | 370/329 |
| 2021/0352385 A1* | 11/2021 | Thollabandi | H04J 14/0238 |
| 2022/0110172 A1 | 4/2022 | Chang et al. | |
| 2022/0253410 A1 | 8/2022 | Haarsager et al. | |
| 2022/0311682 A1* | 9/2022 | Sevindik | H04L 41/5029 |
| 2022/0337283 A1 | 10/2022 | Hsu et al. | |
| 2022/0353928 A1* | 11/2022 | Dao | H04W 76/10 |
| 2023/0081673 A1* | 3/2023 | Junkins | H04W 24/08 |
| | | | 370/235 |
| 2024/0406071 A1* | 12/2024 | Olshansky | H04W 8/04 |

OTHER PUBLICATIONS

3GPP TS 29.513 V15.5.0, "3rd Generation Partnership Project; Technical Specification Group Core Network and Terminals; 5G System; Policy and Charging Control signalling flows and QoS parameter mapping; Stage 3 (Release 15)", Technical Specification, Sep. 2019, 87 pages.

* cited by examiner

DYNAMIC BANDWIDTH CAPACITY CONTROL FOR ENTERPRISES

BACKGROUND

Best-effort delivery is the conventional network configuration protocol for consumer markets. With best-effort delivery, a Communication Service Provider (CSP) does not guarantee quality of service or bandwidth amounts for users. In general, a network utilizing best-effort delivery will attend users in order of when the users request bandwidth. Accordingly, network performance (e.g., network delay, packet loss, latency, etc.) experienced by users can vary based on factors such as network traffic load, network equipment capacity, etc.

The network slicing concept introduced by the 5G standard presents an alternative solution to best-effort delivery for enterprises. Network slicing may refer to creation and operation of multiple virtual networks (i.e., network slices) over a common physical network. For example, 5G equipment/infrastructure may be "divided" into network slices (e.g., 5% of a particular antenna's capacity may be allocated to a particular network slice, 5% of a connection that connects the antenna to core 5G infrastructure may be allocated to the network slice, 5% of the core 5G equipment associated the connection may be allocated to the network slice, etc.).

Network slices within a 5G network may be dedicated to specific use cases and/or customers (e.g., enterprises). For example, an enterprise can pay/contract with a CSP to have a "slice" of a 5G network dedicated to the enterprise. The network slice may comprise an end-to-end network tailored to fulfil particularized requirements requested by the enterprise. For this reason, network slicing is sometimes considered a private (or private-like) 5G network solution for enterprises.

BRIEF DESCRIPTION OF THE DRAWINGS

The present disclosure, in accordance with one or more various examples, is described in detail with reference to the following figures. The figures are provided for purposes of illustration only and merely examples.

Figure 1:
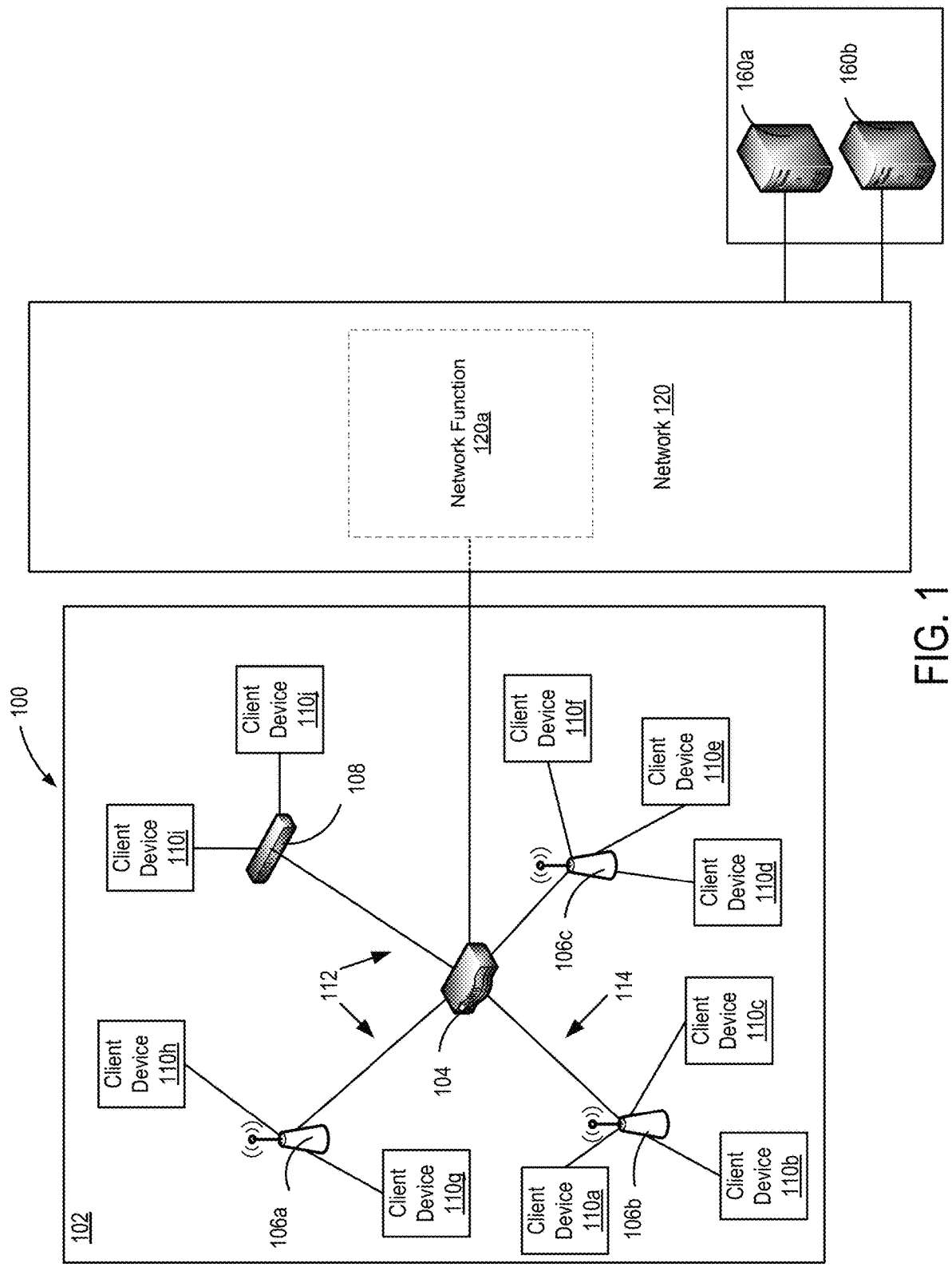
FIG. 1 illustrates an example network deployment that may be implemented for an enterprise, in accordance with various examples of the presently disclosed technology.

The figures are not exhaustive and do not limit the present disclosure to the precise form disclosed.

DETAILED DESCRIPTION

As described above, network slicing presents an alternative solution to best-effort delivery for enterprises. For example, an enterprise can pay/contract with a CSP to have a "slice" of a 5G network dedicated to the enterprise. The network slice may comprise an end-to-end network tailored to fulfil particularized requirements requested by the enterprise. For this reason, network slicing is sometimes considered a private (or private-like) 5G network solution for enterprises.

While network slicing can be an appealing new solution for certain large enterprises, network slicing can be cost-prohibitive for many small to mid-sized enterprises. This is in part because the equipment and other resources required to build out a 5G network slice can be expensive. Relatedly, the resources required to operate and maintain a network slice can be significant. Accordingly, network slicing solutions typically only make economic sense for large enterprises that can make, and benefit from, such a large equipment and resource investment. More traditional private networks (i.e., self-contained networks comprising equipment dedicated wholly to a specific user/enterprise) require similar investments, and are thus often ill-fitted solutions for small to mid-sized enterprises.

Implementing network slicing can also be a challenge from a CSP's perspective. For example, many CSPs continue to operate 4G networks and 4G+5G hybrid networks (sometimes referred to as "non-stand-alone 5G networks") that utilize 4G core equipment. In general, 4G core equipment does not support network slicing. Accordingly, many CSPs can only implement network slices using a subset of their core equipment, which can limit the availability and performance of network slicing solutions.

For at least the reasons stated above, there is a need for alternative solutions to network slicing and traditional private networks that: (a) are more affordable and easier to implement for small to mid-sized enterprises; and (b) can be implemented using legacy 4G core equipment currently utilized by many CSPs.

Against this backdrop, examples of the presently disclosed technology provide an affordable private bandwidth reservation and control solution for enterprises that can be implemented using both 5G and 4G core equipment. Namely, an enterprise can purchase/contract for a pre-determined amount of bandwidth (e.g., 1 Gbps) that a CSP will reserve for connected client devices of the enterprise that meet a set of criteria defined by the enterprise/CSP. Such criteria may be referred to as dynamic bandwidth capacity control (DBCC) group criteria. An example of DBCC group criteria may include: (1) a client device is connected to a network; (2) the connected client device is a registered client device of the enterprise; (3) the connected client device is connected between 7:00 a.m. and 6:00 p.m.; and 4) the connected client device is within a defined geographic area (e.g., the premises of the enterprise). Accordingly, client devices that meet this DBCC group criteria may be "bound" to a DBCC group session. If a bound client device no longer meets the DBCC group criteria (e.g., the client device disconnects from the network, or the client device leaves the enterprise premises), the client device may be unbound from the DBCC group session.

As client devices bind and unbind from a DBCC group session, examples can dynamically modify an aggregation bandwidth capacity control policy that defines bandwidth allocation for client devices bound to the DBCC group session. For example, if client devices unbind from the DBCC group session, examples can modify the aggregation bandwidth capacity control policy such that the remaining bound client devices are allocated larger shares of the pre-determined amount of bandwidth (e.g., 1 Gbps) reserved for client devices bound to the DBCC group session. Conversely, if new client devices bind to the DBCC group session, examples can modify the aggregation bandwidth capacity control policy such that bound client devices are allocated reduced shares of the pre-determined amount of bandwidth (e.g., 1 Gbps) reserved for client devices bound to the DBCC group session.

Examples of the presently disclosed technology may be implemented by a CSP's Policy Control Function (PCF) system (as used herein, a PCF system may refer to a system and/or network function that manages access to network resources, governs network behavior, and/or enables dynamic control of network service quality). The PCF system may: (1) receive a request for a client device to initiate a network session; (2) responsive to determining the requested network session matches dynamic bandwidth capacity control (DBCC) group criteria, bind the client device to a DBCC group session; (3) responsive to binding the client device to the DBCC group session, modify an aggregation bandwidth capacity control policy that defines bandwidth allocation for client devices bound to the DBCC group session, wherein the aggregation bandwidth capacity control policy includes a pre-determined aggregate amount of bandwidth reserved for client devices bound to the DBCC group session; and (4) in accordance with the modified aggregation bandwidth capacity control policy, send instructions to reduce bandwidth allocation for at least one other client device bound to the DBCC group session prior to the client device. In various examples, responsive to the client device unbinding from the DBCC group session, the PCF system may: (1) remodify the aggregation bandwidth capacity control policy; and (2) in accordance with the remodified aggregation bandwidth capacity control policy, send instructions to increase bandwidth allocation for at least one other client device still bound to the DBCC group session. As alluded to above, the DBCC group criteria may be specific to an enterprise (e.g., a small to mid-sized enterprise). In these examples, the DBCC group criteria may include at least one of the following criteria: (a) the client device is connected to a network associated with the network session; (b) the client device is connected to the network in a specified time interval (e.g., between 7:00 a.m. and 6:00 p.m.); (c) the client device is connected to the network in a specified geographic region (e.g., the premises of the enterprise); and (d) the client device is a registered client device of the enterprise. In various examples, the request for the client device to initiate the network session may be received from a network function (e.g., a 5G SMF network function or a 4G PCEF network function). Likewise, the instructions to reduce bandwidth allocation for the at least one other client device bound to the DBCC group session prior to the client device may be sent to the network function. As alluded to above, the network function may be associated with 4G or 5G network infrastructure.

As described above, examples of the presently disclosed technology provide an affordable alternative to network slicing. This is in part because examples of the presently disclosed technology do not involve "slicing" (i.e., dividing/devoting) a percentage of core 5G infrastructure for a private enterprise. Instead, an amount of bandwidth is reserved/guaranteed for connected client devices of the enterprise that meet a set of criteria defined by the enterprise/operator (i.e., the DBCC group criteria). It's a subtle distinction, but an important one. Also, unlike network slicing which can only be implemented on stand-alone 5G core equipment/networks, examples of the presently disclosed technology can be implemented with 4G core equipment/networks, and non-stand-alone 5G core equipment/networks (i.e., 4G+5G hybrid networks). Accordingly, examples of the presently disclosed technology may provide a more efficient (and less expensive) use of existing core equipment/infrastructure currently operated by many CSPs.

Examples of the presently disclosed technology will now be described in greater detail in conjunction with the following FIGs.

To start, it may be useful to describe a network or system within which the aforementioned method of dynamic bandwidth capacity control may be implemented. FIG. 1 illustrates an example network deployment 100 that may be implemented for an enterprise, such as a business, educational institution, governmental entity, healthcare facility or other organization. This diagram illustrates an example of a configuration implemented with an enterprise having multiple users (or at least multiple client devices 110) at a geographical site 102.

Geographical site 102 may include a primary network, which can be, for example, an office network, home network or other network installation. The geographical site 102 network may be a private network, such as a network that may include security and access controls to restrict access to authorized users of the private network. Authorized users may include, for example, employees of an enterprise at geographical site 102, residents of a house, customers at a business, and so on. In the illustrated example, geographical site 102 includes a controller 104 in communication with a network 120. As depicted, in various examples controller 104 may be in communication with a network function 120a associated with network 120. Controller 104 may provide communication with network 120 for geographical site 102, though it may not be the only point of communication with network 120 for geographical site 102. A single controller 104 is illustrated, though geographical site 102 may include multiple controllers and/or multiple communication points network 120. In some examples, controller 104 communicates with network 120 through a router (not illustrated). In other examples, controller 104 provides router functionality to the devices in geographical site 102.

Controller 104 may be operable to configure and manage network devices, such as at geographical site 102. Controller 104 may be operable to configure and/or manage switches, routers, access points, and/or client devices connected to a network. Controller 104 may itself be, or provide the functionality of, an access point.

Controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device of client devices 110a-j may access network resources, including other devices on geographical site 102 and network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IoT) devices, and the like.

Within geographical site 102, a switch 108 is included as one example of a point of access to the network established in geographical site 102 for wired client devices 110*i-j*. Client devices 110*i-j* may connect to switch 108 and through switch 108, may be able to access other devices within network deployment 100. Client devices 110*i-j* may also be able to access network 120, through switch 108. Client devices 110*i-j* may communicate with switch 108 over a wired 112 connection. In the illustrated example, switch 108 communicates with controller 104 over wired 112 connection, though this connection may also be wireless.

Wireless APs 106*a-c* are included as another example of a point of access to the network established in geographical site 102 for client devices 110*a-h*. Each of APs 106*a-c* may be a combination of hardware, software, and/or firmware that is configured to provide wireless network connectivity to wireless client devices 110*a-h*. In the illustrated example, APs 106*a-c* can be managed and configured by controller 104. APs 106*a-c* communicate with controller 104 and the network over connections 112, which may be either wired or wireless interfaces.

An AP generally refers to a networking device that allows a wireless client device to connect to a wireless network. An AP can include a processor, memory, and I/O interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include memory, including read-write memory (i.e., volatile memory), and a hierarchy of persistent memory (i.e., non-volatile memory) such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

Network 120 may be a public or private network, such as the Internet, or other communication network to allow connectivity with geographical site 102, as well as access to servers 160*a-b*. Network 120 may be implemented using core equipment of a CSP such as telecommunication lines (e.g., phone lines, coaxial cable, fiber optic cables, satellite communications, cellular communications, and the like), intermediate network devices (e.g., switches, routers, gateways, servers, and/or controllers), etc. As alluded to above, the core equipment used to implement network 120 may comprise any combination of 4G and 5G core equipment.

As depicted, network 120 may include/implement a network function 120*a*. As used herein, a network function may refer to a functional building block within a network infrastructure. In other words, a network's core infrastructure can be broken down into a number of micro-services, referred to as network functions. Examples of network functions for 5G networks include a Core Access and Mobility Management Function (AMF) and a Session Management Function (SMF), which may communicate with a Unified Data Manager (UDM). An example of a 4G network function can include a Policy and Charging Enforcement Function (PCEF), a Policy and Charging Rules Function (PCRF), etc. Accordingly, network function 120*a* may comprise various types of 5G and/or 4G network functions. As alluded to above, such a network function may communicate with a CSP's Policy Control Function (PCF) system (see e.g., PCF system 210 of FIG. 2) in order to implement dynamic bandwidth capacity control in accordance with examples of the presently disclosed technology. For example, network function 120*a* may send, to the CSP's PCF system, a request for a client device to initiate a network session on network 120. Network function 120*a* may also receive, from the CSP's PCF system, instructions to modify bandwidth allocation for client devices bound to a DBCC group session in response to other client devices binding to, or unbinding from, the DBCC group session. Network function 120*a* can then relay these instructions to the client devices via the pathways/mechanisms described above. Accordingly, the client devices can modify their policy settings/configuration in accordance with the bandwidth allocation modification instructions.

Figure 2:
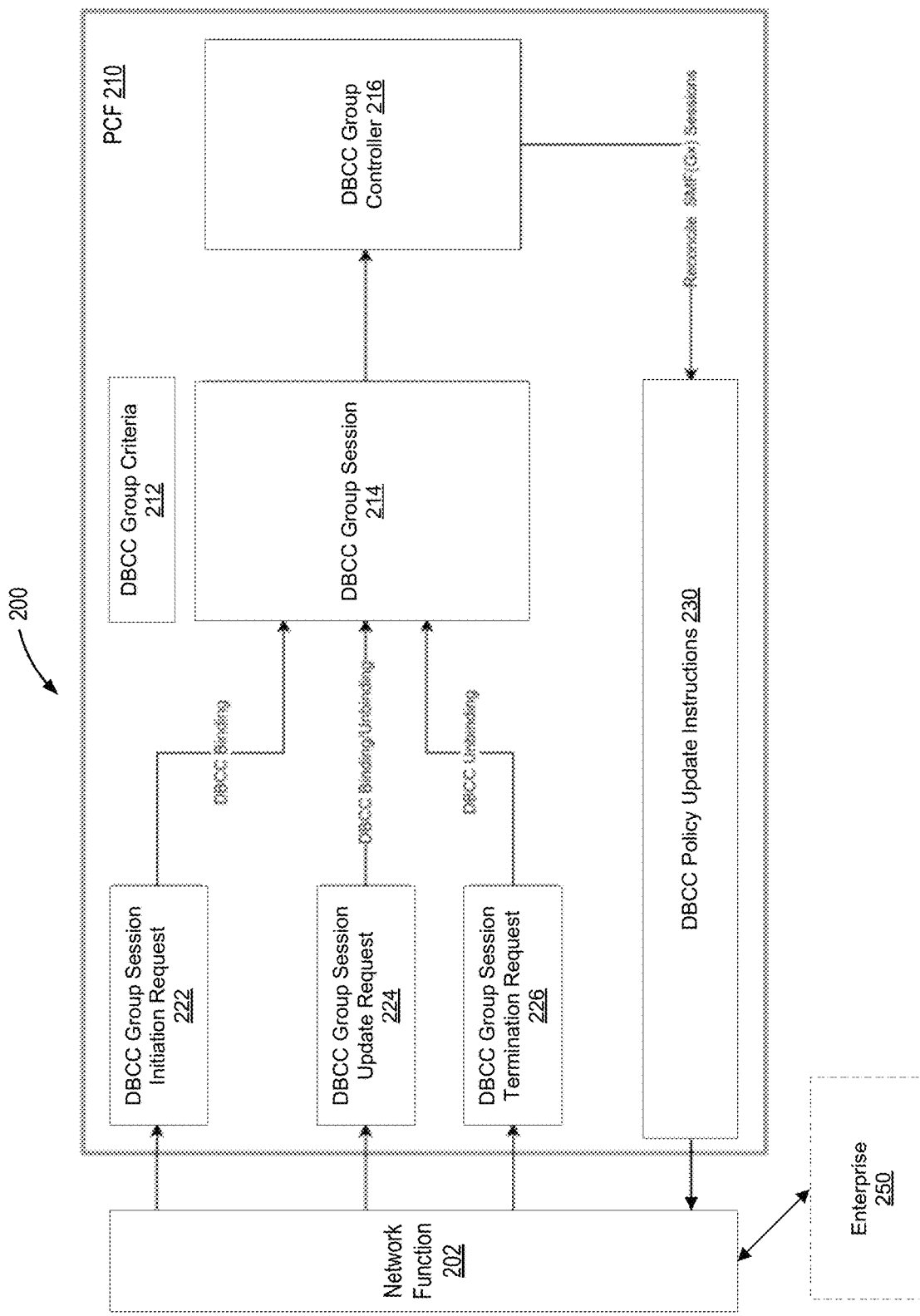
FIG. 2 illustrates an example Policy Control Function (PCF) system that may be used to implement dynamic bandwidth capacity control (DBCC), in accordance with various examples of the presently disclosed technology.

FIG. 2 illustrates an example Policy Control Function (PCF) system 210 that may be used to implement dynamic bandwidth capacity control, in accordance with various examples of the disclosed technology. As depicted, PCF system 210 may be implemented over a network 200. Network 200 may be a 4G network, a 4G+5G hybrid network (sometimes referred to as a non-stand-alone 5G network), a 5G network, etc. In various examples, network 200 may be the same/similar as network 120 described in conjunction with FIG. 1.

As alluded to above, examples of the presently disclosed technology provide an affordable private bandwidth reservation and control solution for enterprises that can be implemented using both 4G and 5G core equipment (e.g., the 4G and/or 5G core equipment used to implement network 200). Namely, an enterprise (e.g., enterprise 250) can purchase/contract for a pre-determined amount of bandwidth (e.g., 1 Gbps) that a CSP will reserve for connected client devices of the enterprise that meet a set of criteria (e.g., DBCC group criteria 212) defined by the enterprise/CSP. Such criteria may be referred to as dynamic bandwidth capacity control (DBCC) group criteria. Accordingly, client devices that meet this DBCC group criteria may be "bound" to a DBCC group session (e.g., DBCC group session 214). If a bound client device no longer meets the DBCC group criteria (e.g., the client device disconnects from network 200, or the client device leaves the premises of enterprise 250), the client device may be unbound from the DBCC group session. As client devices bind and unbind from a DBCC group session, examples (e.g., DBCC group controller 216) can dynamically modify an aggregation bandwidth capacity control policy that defines bandwidth allocation for client devices bound to the DBCC group session. For example, if client devices unbind from the DBCC group session, examples can modify the aggregation bandwidth capacity control policy such that the remaining bound client devices are allocated larger shares of the pre-determined amount of bandwidth (e.g., 1 Gbps) reserved for client devices bound to the DBCC group session. Conversely, if new client devices bind to the DBCC group session, examples can modify the aggregation bandwidth capacity control policy such that bound client devices are allocated reduced shares of the pre-determined amount of bandwidth (e.g., 1 Gbps) reserved for client devices bound to the DBCC group session.

As alluded to above, examples of the presently disclosed technology may be implemented by a CSP's PCF system. As used herein, a PCF system may refer to a system and/or network function that manages access to network resources, governs network behavior, and/or enables dynamic control of network service quality. For example, PCF system 210 may be a dual-mode network function that provides policy control for 4G networks, 4G+5G hybrid networks (sometimes referred to as non-stand-alone 5G networks), 5G networks, etc. Accordingly, PCF system 210 can support dynamic governance of network policies (including bandwidth allocation policies), security policies, service policies, etc. In other words, PCF system 210 may serve as a centralized policy decision point, governing traffic and managing user experience across different CSP services and enterprises.

As depicted, PCF 210 may include a DBCC group controller 216 that dynamically modifies the aggregation bandwidth capacity control policy that defines bandwidth allocation for client devices bound to DBCC group session 214. As alluded to above, the client devices bound to DBCC group session 214 may be client devices that satisfy DBCC group criteria 212—which may be stored by PCF system 210. DBCC group criteria 212 may be enterprise-specific. For example, DBCC group criteria 212 may be specific to an enterprise 250, and may be defined by enterprise 250 and/or a CSP provisioning network 200. Examples of criteria for DBCC group criteria 212 may include any one or combination of: (1) connection to network 200; (2) connection to network 200 in a specified time interval; (3) connection to network 200 within a specified geographic region (e.g., the premises of enterprise 250); and (4) being a registered client device of enterprise 250. In certain examples, DBCC group criteria 212 may also include rules/criteria that DBCC group controller 216 uses to determine the aggregation bandwidth capacity control policy that defines bandwidth allocation for client devices bound to DBCC group session 214. For example, DBCC group criteria 212 may include a maximum bandwidth per client device (e.g., 0.1 Gbps). As another example, DBCC group criteria 212 may specify that certain client devices (e.g., client devices critical to the operation of enterprise 250) bound to DBCC group session 214 should be allocated a greater share of the pre-determined amount of bandwidth (e.g., 1 Gbps) reserved for enterprise 250 than other client devices bound to DBCC group session 214. In some examples, the DBCC group criteria 212 may specify that unallocated portions of the pre-determined amount of bandwidth reserved for enterprise 250 may be allocated to client devices outside of enterprise 250 when the client devices of enterprise 250 do not require the unallocated portions of bandwidth. For example, if 1 Gbps of bandwidth is reserved for enterprise 250, but (1) DBCC group criteria 212 specifies a maximum bandwidth per client device of 0.1 Gbps, and (2) at a given time only 56 client devices are bound to DBCC group session 214—DBCC group criteria 212 may specify that up to 0.24 Gbps of bandwidth can be made available to client devices not associated with enterprise 250 and/or DBCC group session 214. Here, 0.2 Gbps (i.e., 1−(0.56+0.24)) may still be kept in reserve for enterprise 250 to accommodate a burst of new client devices binding to DBCC group session 214.

In various examples, each client device bound to DBCC group session 214 can have its own associated network session that connects the client device to network 200. These network sessions may be independent of DBCC group session 214. DBCC group session 214 may be a group level logical session that DBCC group controller 216 leverages to determine the aggregation bandwidth capacity control policy that defines bandwidth allocation for client devices (logically) bound to DBCC group session 214. Network sessions connecting client devices to network 200 that meet/match DBCC Group Criteria 212 may be logically bound to DBCC group session 214. Conversely, network sessions connecting client devices to network 200 that do not meet/match DBCC Group Criteria 212, may not be logically bound to DBCC group session 214. In certain examples, DBCC group session 214 may include aggregated information for the network sessions logically bound to it (sometimes referred to as opt-in network sessions). As alluded to above, opt-in network sessions may comprise network sessions that match DBCC Group Criteria 212.

As alluded to above, DBCC group controller 216 can dynamically modify the aggregation bandwidth capacity control policy that defines bandwidth allocation for client devices bound to DBCC group session 214 as client devices bind and unbind from DBCC group session 214. Such modifications will generally impact client devices previously bound to DBCC group session 214 (in the case of new client devices binding to DBCC group session 214) and/or client devices that remain bound to DBCC group session 214 (in the case of previously bound client devices unbinding from DBCC group session 214). For example, in response to one or more new client devices binding to DBCC group session 214, DBCC group controller 216 may modify the aggregation bandwidth capacity control policy such that bandwidth allocation is reduced for client devices previously (and still) bound to DBCC group session 214. In other words, "slices of the bandwidth pie" may be reduced for these client devices as more client devices bind to DBCC group session 214. By contrast, in response to one or more client devices unbinding from DBCC group session 214, DBCC group controller 216 may modify the aggregation bandwidth capacity control policy such that bandwidth allocation is increased for client devices still bound to DBCC group session 214. In other words, "slices of the bandwidth pie" may be increased for these client devices as fewer client devices are bound to DBCC group session 214. In certain examples, DBCC group controller 216 may not modify the aggregation bandwidth capacity control policy in response to every client device that binds to, or unbinds from, DBCC group session 214. Instead, DBCC group controller 216 may modify the aggregation bandwidth capacity control policy based on numeric intervals of client devices bound to DBCC group session 214. For example, DBCC group controller 216 may govern a first aggregation bandwidth capacity control policy when 1-10 client devices are bound to DBCC group session 214, a second aggregation bandwidth capacity control policy when 11-20 client devices are bound to DBCC group session 214, a third aggregation bandwidth capacity control policy when 21-30 client devices are bound to DBCC group session 214, etc. In other words, only a transition from one numeric interval to another numeric interval may trigger an aggregation bandwidth capacity control policy modification. Such a scheme may be more efficient to implement than a scheme that modifies the aggregation bandwidth capacity control policy in response to every binding or unbinding from DBCC group session 214.

As alluded to above, a client device may be bound to DBCC group session 214 when the client device (or a network session associated with the client device), satisfies DBCC group criteria 212. A client device may unbind from DBCC group session 214 when the client device no longer satisfies DBCC group criteria 212. For example, if a client device leaves the premises of enterprise 250, it may no longer meet DBCC group criteria 212, and may be unbound from DBCC group session 214. As another example, DBCC group criteria 212 may require that a client device is connected to network 200 between 7:00 a.m. and 6:00 p.m. Accordingly, at 6:00 pm (or 6:01 pm depending on the specific criteria), all client devices bound to DBCC group session 214 may be unbound. In various examples, DBCC group controller 216 may perform the binding and unbinding operations described above.

As depicted, in response to modifying the aggregation bandwidth capacity control policy for DBCC group session 214, DBCC group controller 216 can send DBCC policy update instructions 230 to network function 202. Accordingly, network function 202 may relay the DBCC policy update instructions 230 to impacted client devices of enterprise 250, which can adjust their bandwidth allocation configurations in response to the DBCC policy update instructions 230. As alluded to above, network function 202 may be a network function associated with network 200. For example, where network 200 is a 4G network, network function 202 may comprise a PCEF network function. Where network 200 is a 5G network, network function may comprise an SMF network function.

As depicted, in certain examples network function 202 may send a DBCC group session initiation request 222 to PCF system 210. DBCC group session initiation request 222 may comprise a request to initiate a DBCC group session for one or more client devices that satisfy DBCC group criteria 212. Likewise, network function 202 can send a DBCC group session update request 224 (e.g., to update the aggregation bandwidth capacity control policy for DBCC group session 214 in response to binding/unbinding of client devices) and/or a DBCC group session termination request 226 (e.g., to terminate DBCC group session 214) to PCF system 210. However, in other examples, DBCC group controller 216 may determine to initiate, modify/update, and/or terminate a DBCC group session without such requests.

While only one DBCC group session is depicted in the specific example of FIG. 2, PCF system 210/DBCC group controller 216 can manage any number of DBCC group sessions associated with any number of enterprises. As alluded to above, each of these DBCC group sessions/enterprises may have their own, individualized DBCC group criteria.

Figure 3:
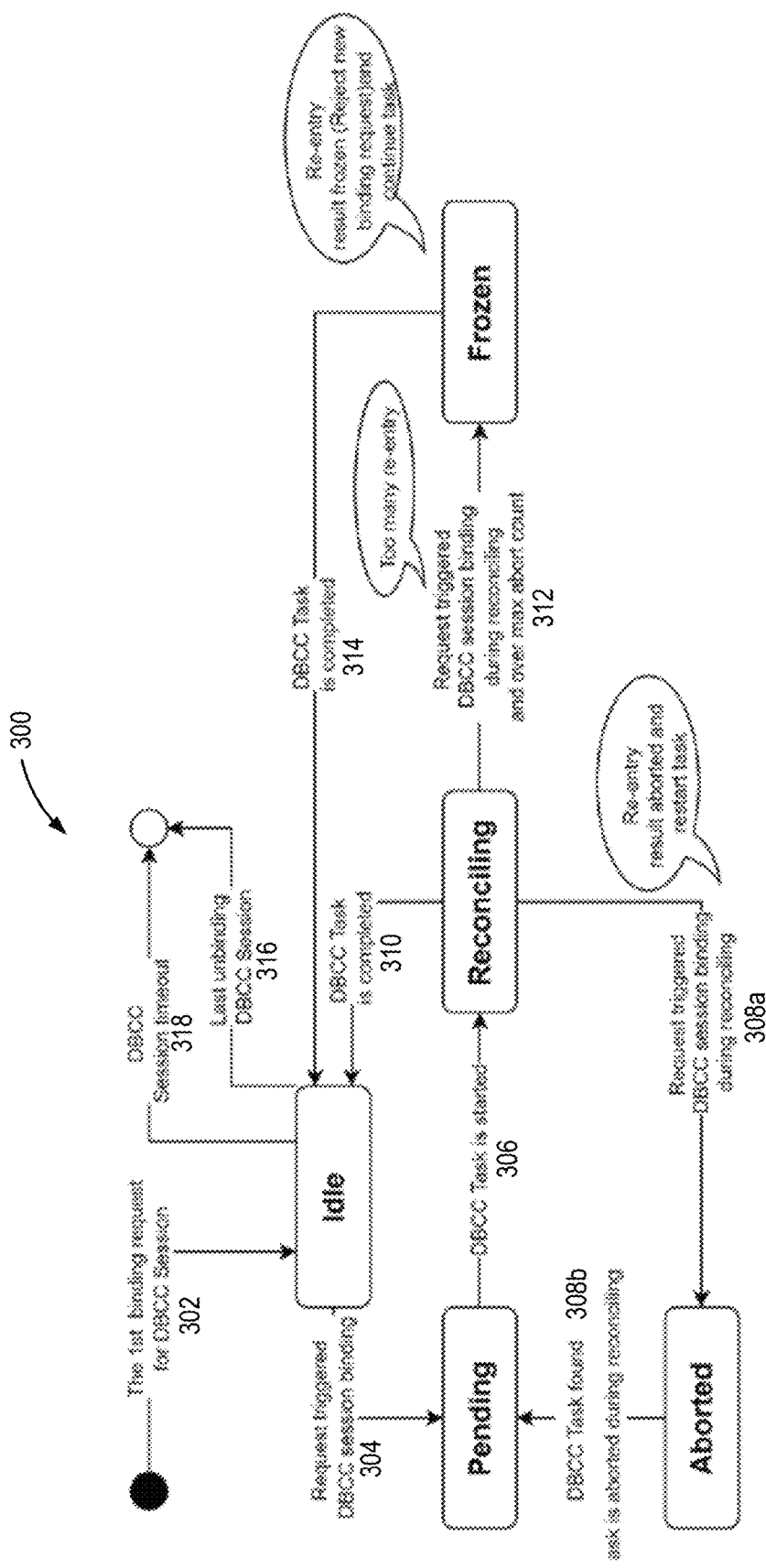
FIG. 3 illustrates an example state transition representation for a DBCC group session, in accordance with various examples of the presently disclosed technology.

FIG. 3 illustrates an example state transition representation 300 for a dynamic bandwidth capacity control (DBCC) group session, in accordance with various examples of the disclosed technology. The operations depicted in state transition representation 300 may be performed by a CSP's PCF system, such as PCF system 210 of FIG. 2.

For example, the PCF system may perform operation 302 to receive a first binding request for a DBCC group session. This may result in an idle state for the DBCC group session until, at operation 304, the PCF system triggers DBCC group session binding. As depicted, triggering the DBCC group session binding may lead to a pending state for the DBCC group session.

As depicted, in some examples the DBCC group session may be associated with a DBCC task. Accordingly, the PCF system can start the DBCC task at operation 306, leading to a reconciling state for the DBCC group session. Here, the DBCC task may be a procedure to reconcile DBCC group session and individual client device network sessions.

As depicted, after starting the DBCC task, the PCF system can perform various reconciliation operations. For example, reconciliation operations 308a and 308b can lead to abortion of the DBCC task—and a return to the pending state for the DBCC group session. By contrast, reconciliation operation 310 can lead to completion of the DBCC task, and a return to the idle state for the DBCC group session. Still further, reconciliation operation 312 can lead to a frozen state for DBCC group session. The frozen state may be triggered when an aborted count exceeds a threshold/maximum value, which means the DBCC task has been interrupted too many times. Entering the frozen state can reduce impacts on individual client device network sessions, and thus reduce a likelihood of a re-authentication signaling storm in the network. Accordingly, the PCF system may reject new binding requests until the DBCC task is completed via operation 314, which may return the DBCC group session to the idle state.

As depicted, from the idle state, a last unbinding operation 316 and/or a DBCC session timeout operation 318 may terminate the DBCC group session.

Figure 4:
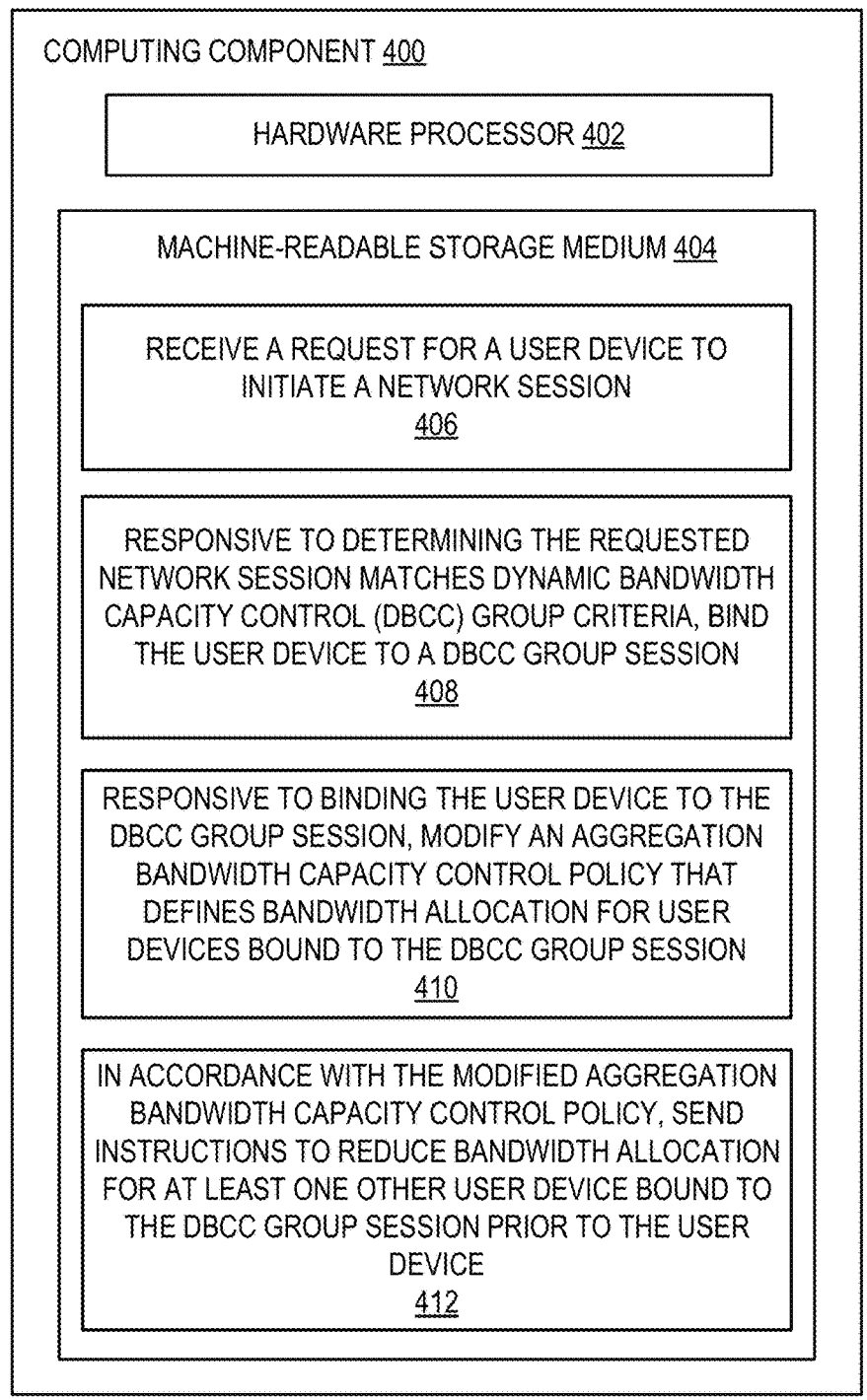
FIG. 4 illustrates an example computing component that may be used to implement DBCC, in accordance with various examples of the presently disclosed technology.

FIG. 4 illustrates an example computing component 400 that may be used to implement dynamic bandwidth capacity control (DBCC), in accordance with various examples of the disclosed technology. Referring now to FIG. 4, computing component 400 may be, for example, a server computer, a controller, or any other similar computing component capable of processing data. In the example implementation of FIG. 4, the computing component 400 includes a hardware processor 402, and machine-readable storage medium for 404. In various examples, computing component 400 may be associated with a Policy Control Function (PCF) system (e.g. PCF system 210 of FIG. 2).

Hardware processor 402 may be one or more central processing units (CPUs), semiconductor-based microprocessors, and/or other hardware devices suitable for retrieval and execution of instructions stored in machine-readable storage medium 404. Hardware processor 402 may fetch, decode, and execute instructions, such as instructions 406-412, to control processes or operations for burst preloading for available bandwidth estimation. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-412.

Hardware processor 402 may execute instruction 406 to receive a request for a client device to initiate a network session. In various examples, the request for the client device to initiate the network session may be received from a network function (e.g., network function 202 of FIG. 2). As alluded to above, the network function may be associated with core 4G equipment/infrastructure and/or 5G core equipment/infrastructure.

Responsive to determining the requested network session matches dynamic bandwidth capacity control (DBCC) group criteria, hardware processor 402 may execute instruction 408 to bind the client device to a DBCC group session. As alluded to above, the DBCC group criteria may be specific to an enterprise and may be defined by the enterprise and/or a CSP providing services to the enterprise. Examples of DBCC group may comprise: (1) the client device is connected to a network associated with the network session; (2) the client device is connected to the network in a specified time interval (e.g., 7:00 a.m.-6:00 p.m.); (3) the client device is connected to the network in a specified geographic region (e.g., premises of the enterprise); and/or (4) the client device is a registered client device of the enterprise.

Responsive to binding the client device to the DBCC group session, hardware processor 402 may execute instruction 410 to modify an aggregation bandwidth capacity control policy that defines bandwidth allocation for client devices bound to the DBCC group session. As described above, the aggregation bandwidth capacity control policy may include a pre-determined aggregate amount of bandwidth (e.g., 1 Gbps) reserved for client devices bound to the DBCC group session.

In accordance with the modified aggregation bandwidth capacity control policy, hardware processor 402 may execute instruction 412 to send instructions to reduce bandwidth allocation for at least one other client device bound to the DBCC group session prior to the client device. In various examples, the instructions to reduce bandwidth allocation for the at least one other client device bound to the DBCC group session prior to the client device may be sent to the network function (e.g., network function 202 of FIG. 2).

In certain examples hardware processor 402 may execute further instructions to: (1) responsive to the client device unbinding from the DBCC group session, remodify the aggregation bandwidth capacity control policy; and (2) in accordance with the remodified aggregation bandwidth capacity control policy, send instructions to increase bandwidth allocation for at least one other client device still bound to the DBCC group session.

Figure 5:
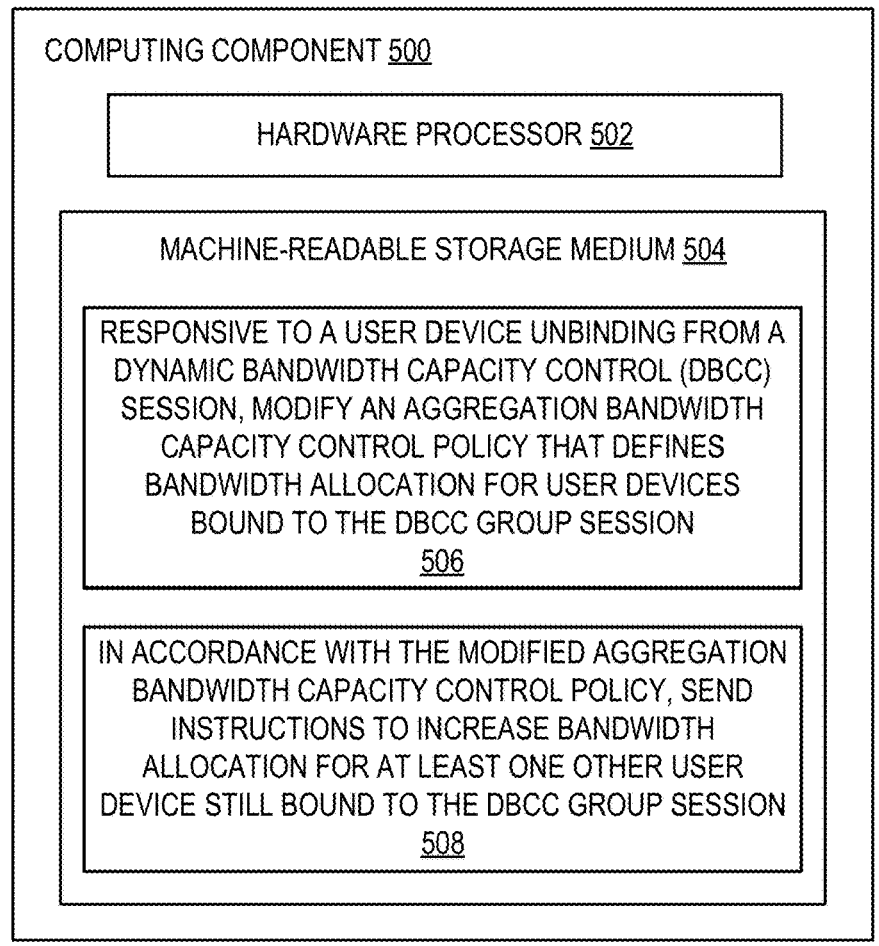
FIG. 5 illustrates another example computing component that may be used to implement DBCC, in accordance with various examples of the presently disclosed technology.

FIG. 5 depicts another example computing component 500 that may be used to implement dynamic bandwidth capacity control, in accordance with various examples of the disclosed technology. Referring now to FIG. 5, computing component 500 may be, for example, a server computer, a controller, or any other similar computing component capable of processing data. In the example implementation of FIG. 5, the computing component 500 includes a hardware processor 502, and machine-readable storage medium for 504. Like computing component 400, computing component 500 may be associated with a Policy Control Function (PCF) system (e.g. PCF system 210 of FIG. 2).

Hardware processor 502 and machine-readable storage medium 504 may be the same/similar as hardware processor 402 and machine-readable storage medium 404 respectively. Accordingly, machine-readable storage medium 504 may be encoded with executable instructions, for example, instructions 506-508.

Responsive to a client device unbinding from a dynamic bandwidth capacity control (DBCC) session, hardware processor 502 may execute instruction 506 to modify an aggregation bandwidth capacity control policy that defines bandwidth allocation for client devices bound to the DBCC group session. The aggregation bandwidth capacity control policy may include a pre-determined aggregate amount of bandwidth (e.g., 1 Gbps) reserved for client devices bound to the DBCC group session. Relatedly, all client devices bound to the DBCC group session may have network sessions that satisfy DBCC group criteria associated with the DBCC group session. As alluded to above, the DBCC group criteria may be specific to an enterprise. Examples of DBCC group criteria may include: (1) connection to a network associated with the DBCC group session; (2) connection to the network in a specified time interval; (3) connection to the network in a specified geographic region; and/or (4) being a registered client device of the enterprise.

In accordance with the modified aggregation bandwidth capacity control policy, hardware processor 502 may execute instruction 508 to send instructions to increase bandwidth allocation for at least one other client device still bound to the DBCC group session. In some examples, the instructions to increase bandwidth allocation for the at least one other client device still bound to the DBCC group session may be sent to a network function (e.g., network function 202 of FIG. 2). As alluded to above, the network function may be associated with 4G core equipment/infrastructure and/or 5G core equipment/infrastructure.

In certain examples, hardware processor 502 may execute further instructions to: (1) receive a request for a second client device to initiate a network session; (2) responsive to determining the requested network session matches the DBCC group criteria, bind the second client device to the DBCC group session; (3) responsive to binding the second client device to the DBCC group session, remodify the aggregation bandwidth capacity control policy; and (4) in accordance with the remodified aggregation bandwidth capacity control policy, send instructions to reduce bandwidth allocation for at least one client device bound to the DBCC group session prior to the second client device. As alluded to above, the request for the client device to initiate the network session may be received from the network function (e.g., network function 202 of FIG. 2).

Figure 6:
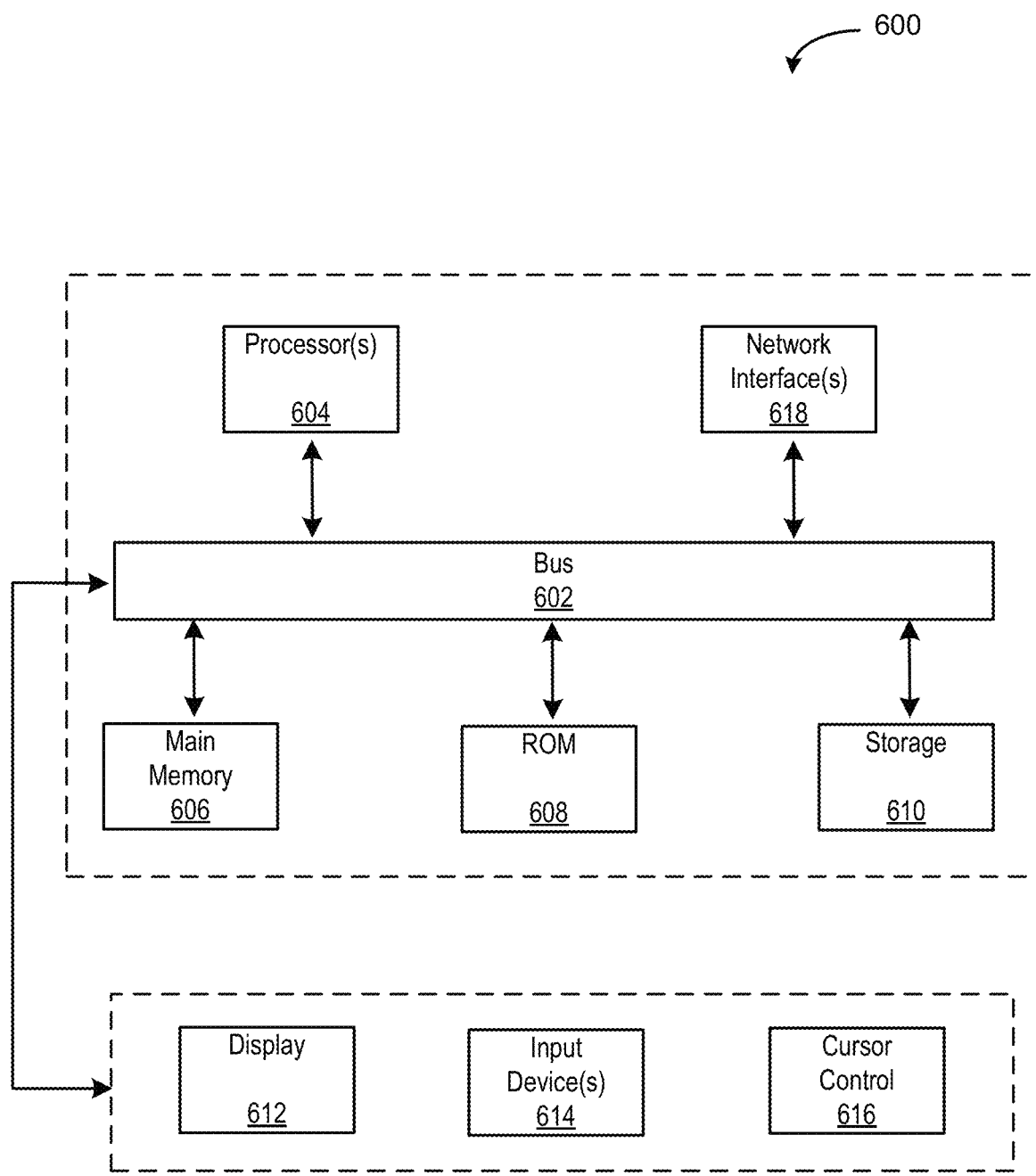
FIG. 6 depicts a block diagram of an example computer system in which various of the examples described herein may be implemented.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   receiving a request for a client device to initiate a network session;
   determining whether operating characteristics of the client device match criteria associated with a dynamic bandwidth capacity control (DBCC) group;
   responsive to determining the operating characteristics of the client device match the criteria associated with the DBCC group, binding the client device to a session associated with the DBCC group;
   responsive to binding the client device to the session associated with the DBCC group, modifying a pre-determined aggregate amount of bandwidth reserved for client devices bound to the session associated with the DBCC group;
   in accordance with the modification, sending instructions to reduce bandwidth allocation for at least one other client device that was bound to the session associated with the DBCC group prior to the client device;
   responsive to the client device unbinding from the session associated with the DBCC group, remodifying the pre-determined aggregate amount of bandwidth, wherein the pre-determined aggregate amount of bandwidth is defined in an aggregation bandwidth capacity control policy; and
   in accordance with the remodified pre-determined aggregate amount of bandwidth, sending instructions to increase bandwidth allocation for at least one other client device still bound to the session associated with the DBCC group.

2. The method of claim 1, wherein the criteria associated with the DBCC group is specific to an enterprise.

3. The method of claim 2, wherein the criteria associated with the DBCC group includes at least one of the following criteria:
   the client device is connected to a network associated with the network session;
   the client device is connected to the network in a specified time interval;
   the client device is connected to the network in a specified geographic region; and
   the client device is a registered client device of the enterprise.

4. The method of claim 1, wherein the method is implemented by a Communication Service Provider's (CSP's) policy control function (PCF) system and the criteria associated with the DBCC group is stored in the CSP's PCF system.

5. The method of claim 1, wherein:
   the request for the client device to initiate the network session is received from a network function; and
   the instructions to reduce bandwidth allocation for the at least one other client device bound to the session associated with the DBCC group prior to the client device are sent to the network function.

6. The method of claim 5, wherein the network function is associated with 4G network infrastructure.

7. A policy control function (PCF) system comprising:
   a one or more processing resources; and
   a non-transitory computer-readable medium, coupled to the one or more processing resources, having stored therein instructions that when executed by the one or more processing resources cause the POF system to:
   receive a request for a client device to initiate a network session;
   determine whether operating characteristics of the client device match criteria associated with a dynamic bandwidth capacity control (DBCC) group;
   responsive to determining the operating characteristics of the client device match the criteria associated with the DBCC group, bind the client device to a session associated with the DBCC group;
   responsive to binding the client device to the DBCC group session, modify a pre-determined aggregate amount of bandwidth reserved for client devices bound to session associated with the DBCC group;
   in accordance with the modification, send instructions to reduce bandwidth allocation for at least one other client device bound to the session associated with the DBCC group prior to the client device;
   responsive to the client device unbinding from the session associated with the DBCC group, remodify the pre-determined aggregate amount of bandwidth, wherein the pre-determined aggregate amount of bandwidth is defined in an aggregation bandwidth capacity control policy; and in accordance with the remodified aggregation bandwidth capacity control policy, send instructions to increase bandwidth allocation for at least one other client device still bound to the DBCC group session.

8. The PCF system of claim 7, wherein the criteria associated with the DBCC group is specific to an enterprise.

9. The PCF system of claim 8, wherein the criteria associated with the DBCC group includes at least one of the following criteria:

the client device is connected to a network associated with the network session;

the client device is connected to the network in a specified time interval;

the client device is connected to the network in a specified geographic region; and the client device is a registered client device of the enterprise.

10. The PCF system of claim 7, wherein the instructions further cause the PCF system to:

receive a request for a second client device to initiate a second network session;

determine whether operating characteristics of the second client device match criteria associated with a second dynamic bandwidth capacity control (DBCC) group;

responsive to determining the operating characteristics of the second client device match criteria associated with the second DBCC group, bind the second client device to a session associated with the second DBCC group, wherein the criteria associated with the second DBCC group and the session associated with the second DBCC group are associated with a second enterprise;

responsive to binding the second client device to the session associated with the second DBCC group, modify a second pre-determined aggregate amount of bandwidth reserved for client devices bound to the session associated with the second DBCC group; and in accordance with the modified second pre-determined aggregate amount of bandwidth, send instructions to reduce bandwidth allocation for at least one other client device bound to the session associated with the second DBCC group prior to the second client device.

11. The PCF system of claim 10, wherein the second pre-determined aggregate amount of bandwidth reserved for client devices bound to the session associated with the second DBCC group is larger than the pre-determined aggregate amount of bandwidth reserved for client devices bound to the sessions associated with the DBCC group.

12. The POF system of claim 7, wherein:

the request for the client device to initiate the network session is received from a network function; and the instructions to reduce bandwidth allocation for the at least one other client device bound to the session associated with the DBCC group prior to the client device are sent to the network function.

13. The POF system of claim 12, wherein the network function is associated with 4G network infrastructure.

* * * * *